United States Patent [19]

Baumann

[11] 3,997,141
[45] Dec. 14, 1976

[54] FLOW CONTROL VALVE
[76] Inventor: Hans D. Baumann, P.O. Box 92, Manville, R.I. 02838
[22] Filed: Nov. 28, 1975
[21] Appl. No.: 636,166
[52] U.S. Cl. .......................... 251/205; 251/DIG. 4; 251/122
[51] Int. Cl.² ......................................... F16K 3/32
[58] Field of Search ............ 251/205, 122, DIG. 4; 137/625.3, 625.37, 625.33

[56] References Cited
UNITED STATES PATENTS

| | | | |
|---|---|---|---|
| 1,720,389 | 7/1929 | Binks | 251/122 |
| 2,833,307 | 5/1958 | Henderson | 251/205 X |
| 3,112,764 | 12/1963 | Anderson et al. | 137/625.3 X |
| 3,187,775 | 6/1965 | Pinnell | 251/122 X |
| 3,631,891 | 1/1972 | Brumm | 137/625.3 |

Primary Examiner—Arnold Rosenthal

[57] ABSTRACT

A control valve, suitable for modulating control of minute flow rates, comprising a cylindrical valve plug having a conical portion slidingly engaged in a cylindrical orifice sleeve, both terminating end portions of which are sealed within and against the inlet portion of a valve body; and wherein said orifice sleeve has one or more perpendicular passages cooperating with the conical portion of the plug to regulate the rate of discharge of fluid through the perpendicular passages as function of the axial displacement of the plug.

5 Claims, 3 Drawing Figures

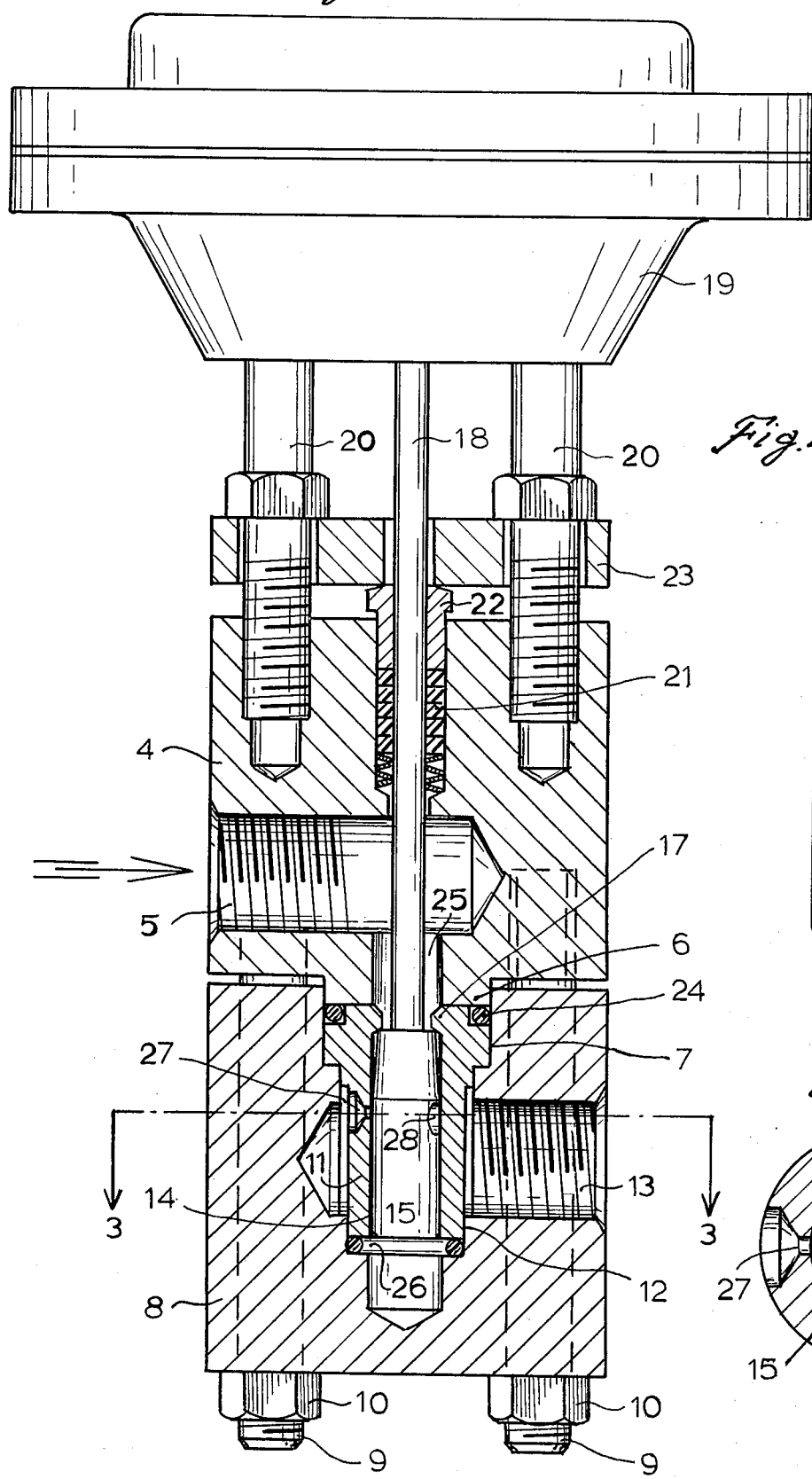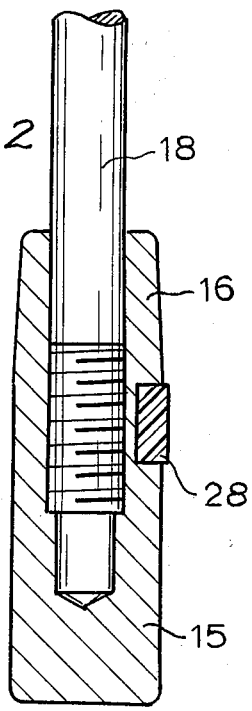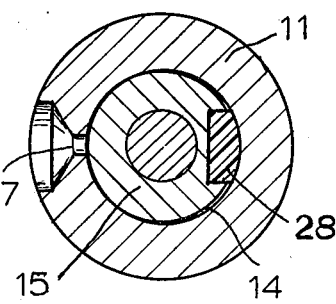

FLOW CONTROL VALVE

BACKGROUND OF THE INVENTION

My invention relates to automatic control valves operated either by a modulating electrical or pneumatical signal to control very minute flow rates, as is customary in the operation of pilot plants in the chemical or petroleum industry. Control valves presently in use for this purpose are either of the low-lift variety utilizing a needle-type plug or the longlift cylindrical plug type with precision machined longitudinal scratch, commonly referred to as micro-splined plugs. Both of these types exhibit some problems. The needle-type plug is commonly limited to a tapered angle of 30° to avoid self-locking against the seatring bore. This in turn reduces the stroke whenever small orifice sizes are required. For example, the maximum usable stroke for control with a 1/32 inch orifice is only 0.055 inch, i.e. much too short to achieve any meaningful positioning accuracy with conventional actuating devices. Another draw-back is the very high tendency for fluids to cavitate with needle plugs resulting in early destruction of the valve parts.

The micro-splined plugs require extremely accurate machining of splined grooves having depths of less than 0.001 inch. The minimum controllable area, limiting the lowest flowrate that can be regulated, is given by the radial clearance between the external diameter of the plug and the orifice bore. With a normal radial clearance of 0.00025 inch the minimum controllable area of such a plug with ¼ inch diameter is $2 \times 10^{-4}$ in$^2$ or 25% of the maximum area of a 1/32 inch dia. orifice, thereby limiting the ratio of max. to min. control area or rangeability to less than 4 : 1.

My invention, on the other hand, greatly reduces the amount of minimum controllable area, since it involves only the product of the radial plug clearance times the circumference of a small bore located perpendicular to the plug axis. For example, with the same radial clearance mentioned in the above example, my minimum controllable area with a 1/32 inch dia. orifice is only $2.4 \times 10^{-5}$ in$^2$, i.e. only 3% of the maximum orifice area.

Additional reductions by one or two order of magnitudes can be made by preloading the plug towards the perpendicular orifice either by utilizing the existing pressure differential or some mechanical means, as explained later on, thereby reducing the radial clearance area i.e. minimum controllable flow area to nearly zero.

A further objection of my invention is the provision of a valve trim with low tendency to cavitate under high pressure liquid flow. My invention accomplishes this goal by having the fluid to undergo a sharp 90° turn from the inlet side (parallel to the cylindrical plug wall) to the perpendicular orifice (outlet port). Such 90° bends cause substantial pressure loss of the fluid and reduce the tendency to cavitate.

One other advantage of my invention is the provision of a valve trim having the advantage to produce high Reynold's numbers, i.e. less effected by viscosity changes in fluids than micro-splined plugs, thereby allowing much more accurate determination of flow capacity.

Finally, my invention provides for a throttling valve trim that can be machined very simply by turning the valve plug tip in shape of a cone, in order to get a very precise and repeatable flow characteristic without resort to unusually precision manufacturing processes.

These and other objections of my invention will become more easily understood from the following detailed description:

BRIEF DESCRIPTION OF THE DRAWINGS

In the accompanying drawings,

FIG. 1 is a vertical, partly sectional view of a preferred embodiment of my invention.

FIG. 2 is an enlarged, central sectional view of the valve plug as part of my invention.

FIG. 3 is an enlarged, horizontal sectional view of the plug and seatring of my invention taken along the line 3—3 of FIG. 1.

DESCRIPTION OF THE PREFERRED EMBODIMENT

Referring to FIG. 1, there is shown a preferred embodiment of my invention suitable for throttling control of minute flow rates and comprising an upper housing 4 having a threaded inlet port 5 and a lower shoulder 6 fitting tightly into a recess 7 of a lower housing 8. Said lower housing 8 is closely coupled with upper housing 4 by means of studs 9 and hex nuts 10. Lower housing 8 contains an orifice member 11 within a central vertical bore 12, which in turn is intersected by a horizontal outlet port 13. Orifice member 11 has a central longitudinal valve plug 15 which upper portion 16 is tapered and which upper terminating end engages a reduced diameter portion 17 of orifice member 11 to provide tight shut-off when in the upper stroke position, as shown.

Valve plug 15 is threadingly engaged by a valve stem 18, the upper terminating end of which is fastened to the moving parts (not shown) of a conventional state of the art valve actuating device 19, the latter being connected to upper housing 4 by a set of posts 20. A suitable packing means 21, such as Teflon, prevents fluid from leaking past the valve stem 18, aided by a gland follower 22 and stuffing box flange 23.

A groove cut into the upper portion of orifice member 11 engages an O-ring type seal 24 whose function it is to prevent leakage from high pressure fluid entering through inlet port 5 and vertical passage 25 to outlet port 13. A similar O-ring 26 is placed between the lower terminating plane surface of orifice member 11 and a stop shoulder in lower housing 8 to prevent leakage of high pressure fluid (in the open-plug position) past the radial clearance between plug and orifice bore to outlet port 13.

The wall of orifice member 11 is intersected by a horizontal passage 27 which defines the actual flow controlling port of the valve. The inner terminating portion of passage 27, which may have a diameter of only 0.020 inch, faces and is covered by the cylindrical portion of plug 15. The min. flow entering passage 27, when plug 15 is barely off seating surface 17, is determined by the outer circumference of said passage and the distance between its inner terminating portion and the valve plug. It is in the interest of a high ratio between max. and min. controllable flow to keep this "uncontrollable" area to an absolute minimum. This can be done by providing tight contact between plug and passage by means of a nylon pellet 28. The latter is press-fitted into a horizontal recess of plug 15 (as shown in FIG. 2) with some of the material protruding somewhat above the cylindrical diameter of plug 15 and thereby allowing for an elastic deformation of said pellet 28 when introduced into the bore 14. This in turn forces plug 15 into tight engagement against the opposite wall surface of bore 14, as more clearly shown in FIG. 3 (clearance between plug and bore shown exagerated).

Throttling flow will commence, once plug 15 is pushed down far enough by actuating device 19, so that the conical portion 16 appears opposite passage 27 to provide the radial clearance necessary to permit flow through passage 27 (the radial clearance is indicated by dashed lines in FIG. 3). The further the plug is pushed down, the smaller the cone diameter becomes, hence the greater the flow area. It should be noted that the fluid has to undergo a sharp 90° turn when flowing in a gradually accelerating manner past the cone surface 16 and into passage 27 and ultimately into outlet port 13. Such torturous flow path not only reduces the chance of cavitation but also produces relatively high Reynolds numbers, thereby eliminating viscosity effects and providing more uniformity in flow capacity determination (Cv) between liquids and gases.

While a particular embodiment of the present invention has been described, it is not intended to limit the invention to such disclosures but changes and modifications may be made herein and thereto within the scope of the following claims:

I claim:
1. Flow control valve, comprising
   a. a housing having fluid communicating inlet and outlet ports, and a central vertical passage interconnecting said inlet and outlet ports;
   b. an orifice member suitably retained within said central vertical passage of said housing and having a central longitudinal bore, only one fluid conducting passage located within said orifice member and extending from the inner bore throughout the radial width of said orifice member;
   c. sealing means located at opposite longitudinal terminating surfaces of said orifice member;
   d. a generally cylindrical valve plug slidingly engaged within said longitudinal bore of the orifice member and, in the closed valve position, covering said fluid conducting passage, the terminating portion of the valve plug having a reduced cross-sectional area profile which, in the open valve position, overlaps the fluid conducting passage within said orifice member to generate a controlled flow area consisting of the product of the circumference of the passage and the distance between the inner wall of the central bore of the orifice and the portion of the outer profile of said valve plug located opposite said passage;
   e. operating means attached to said valve plug.
2. A flow control valve as described in claim 1, wherein said reduced cross-sectional area profile of the valve plug has the shape of a cone with its smallest diameter at one terminating end of the plug.
3. A flow control valve as described in claim 1, wherein said operating means comprises a valve stem threadingly engaging said valve plug on one end and a valve actuating device of conventional construction at the other end.
4. A flow control valve as described in claim 1, having seating means located at one terminating portion of said orifice means, and wherein said seating means consists of a reduced diameter portion located near one plane terminating surface of said orifice member.
5. A flow control valve as described in claim 1, wherein said valve plug incorporates spring means to force the outer cylindrical wall of said valve plug into close engagement with the inner wall of the bore of said orifice member.

* * * * *